United States Patent

Galicia

[15] 3,666,099

[45] May 30, 1972

[54] METHOD OF AND APPARATUS FOR SEPARATING LIQUIDS

[72] Inventor: Frank Galicia, 5043 Catherine St., Philadelphia, Pa. 19143

[22] Filed: Nov. 6, 1970

[21] Appl. No.: 87,505

[52] U.S. Cl. ............................ 210/83, 210/242, 210/DIG. 21
[51] Int. Cl. ........................................................ E02b 15/04
[58] Field of Search ..................... 210/83, DIG. 21, 304, 512, 210/242

[56] References Cited

FOREIGN PATENTS OR APPLICATIONS 931,594   7/1963   Great Britain .................. 210/DIG. 21

*Primary Examiner*—J. L. DeCesare
*Attorney*—W. Wyclif Walton

[57] ABSTRACT

This invention relates to the separation of liquids of different densities and is directed primarily to a method and apparatus for moving an inverted inclined V-shaped trough relatively to a liquid floating on a more dense one to carry the less dense liquid below the liquid interface for release into a conduit or chamber from which it may be collected and removed free of the more dense of the two liquids.

10 Claims, 8 Drawing Figures

INVENTOR.
FRANK GALICIA

Patented May 30, 1972

INVENTOR.
FRANK GALICIA
BY
ATTORNEY

Patented May 30, 1972
3,666,099
3 Sheets-Sheet 3
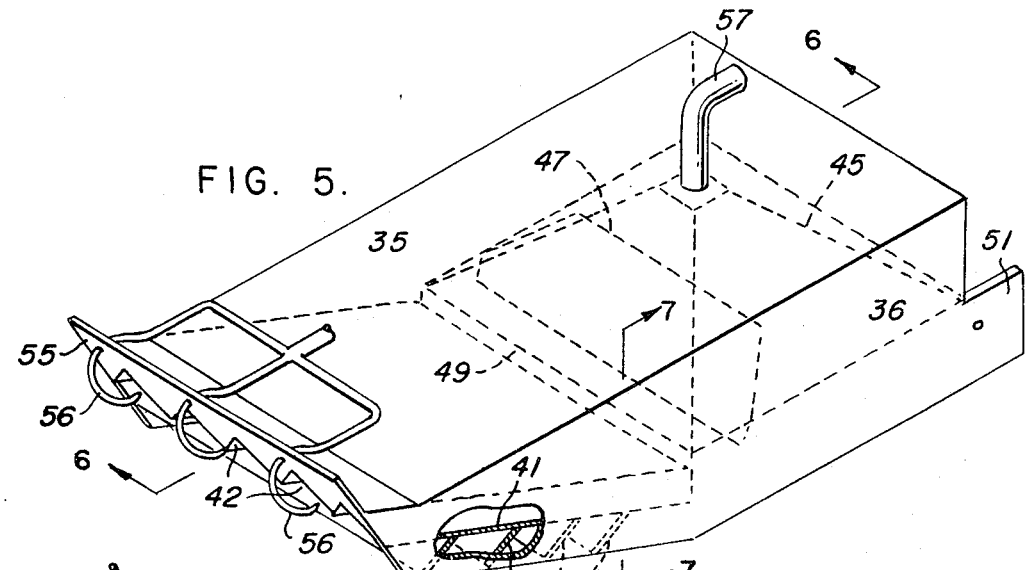
FIG. 5.
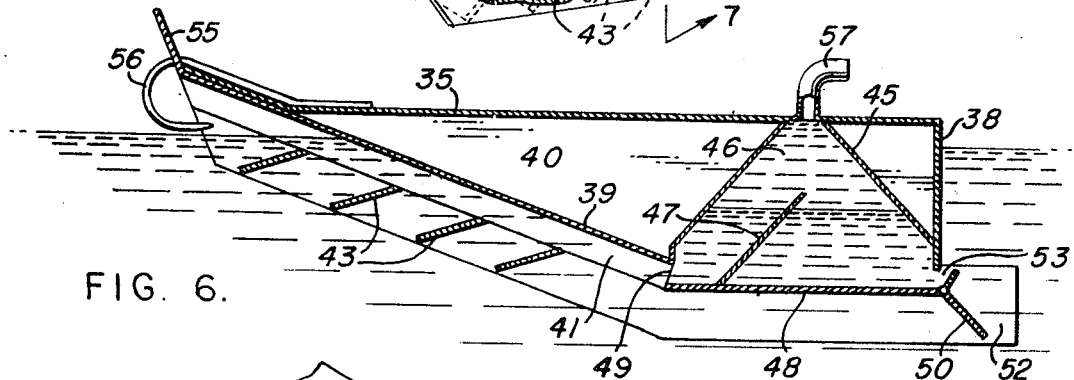
FIG. 6.
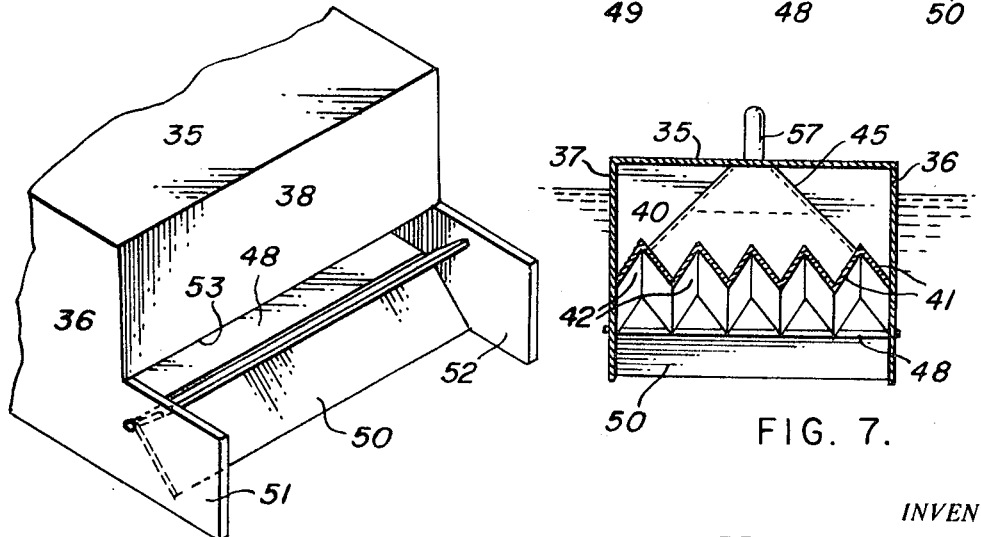
FIG. 8.
FIG. 7.
INVENTOR.
FRANK GALICIA
BY
ATTORNEY

METHOD OF AND APPARATUS FOR SEPARATING LIQUIDS

BACKGROUND OF THE INVENTION

1. Field of the Invention

With the increasing awareness of the public that indiscriminate pollution of waterways, watercourses, lakes, bays and oceans primarily by oil and oily wastes constitutes a threat to the general welfare it has become important that a method and means be made available for collecting and removing from bodies of water contaminating oil and oily products floating thereon as efficiently and completely as possible and this invention contemplates the provision of means which in one embodiment may be towed or otherwise impelled over the surface of a body of water containing floating liquid contaminants for removing such contaminants from the surface of the water and collecting them, substantially free from occluded or entrained water, for inocuous disposal.

Another embodiment of the invention contemplates means which may be moored at an appropriate point in a flowing stream for collecting floating contaminants as they are carried to the vicinity of said means by natural flow of the water in the stream.

2. The Prior Art

Many devices have heretofore been proposed for skimming floating contaminants from natural waters, either free flowing or confined but so far as I am aware none has comprised an inverted V-shaped structure extending below the water surface and adapted when activated to move relatively thereto to carry floating contaminants to a sub-surface collection point from which they may be removed for disposal relatively free of contained or occluded water.

SUMMARY OF THE INVENTION

In accordance with the invention an inverted V-shaped trough is disposed at a relatively small angle to the horizontal intersecting the interface between a body of water and a substance of lesser density floating thereon and is translated, either rotatively or linearly relatively to the water to carry the floating material below the interface to a receptacle in which it is collected for removal to an appropriate tank or other vessel for disposal.

BRIEF DESCRIPTION OF THE DRAWINGS

In the accompanying drawings:

FIG. 5 is a perspective view of an embodiment of the invention in apparatus comprising a plurality of rectilinear V-shaped troughs designed to be translated on the surface of a body of water as by a towing craft (not shown) pursuing a more or less rectilinear course over a body of water on which a body or a plurality of bodies of oil or the like may have been deposited;

FIG. 6 is a section thereof on line 6—6 in FIG. 5;

FIG. 7 is a section on line 7—7 in FIG. 5 but on a reduced scale, and;

FIG. 8 is a perspective detail of the rear end or stern portion of the above apparatus showing adjustable means for regulating the flow of water there-through.

DESCRIPTION OF THE PREFERRED EMBODIMENTS

The invention is susceptible of embodiment in two significantly different specific types of apparatus as above indicated, namely apparatus designed for relatively stationary positioning, and embodying a rotatable element driven from an associated power source (not shown) as illustrated in FIGS. 1-5 inclusive and apparatus embodying no moving parts, other than certain adjustable ones but designed to be translated on the water surface and to derive activating force from the craft or other prime mover by which it is so translated. These embodiments utilize the same principle of operation insofar as the operation of collecting floating contaminants from the water surface is concerned but realize the advantages of the invention in specifically different ways.

Figure 1:
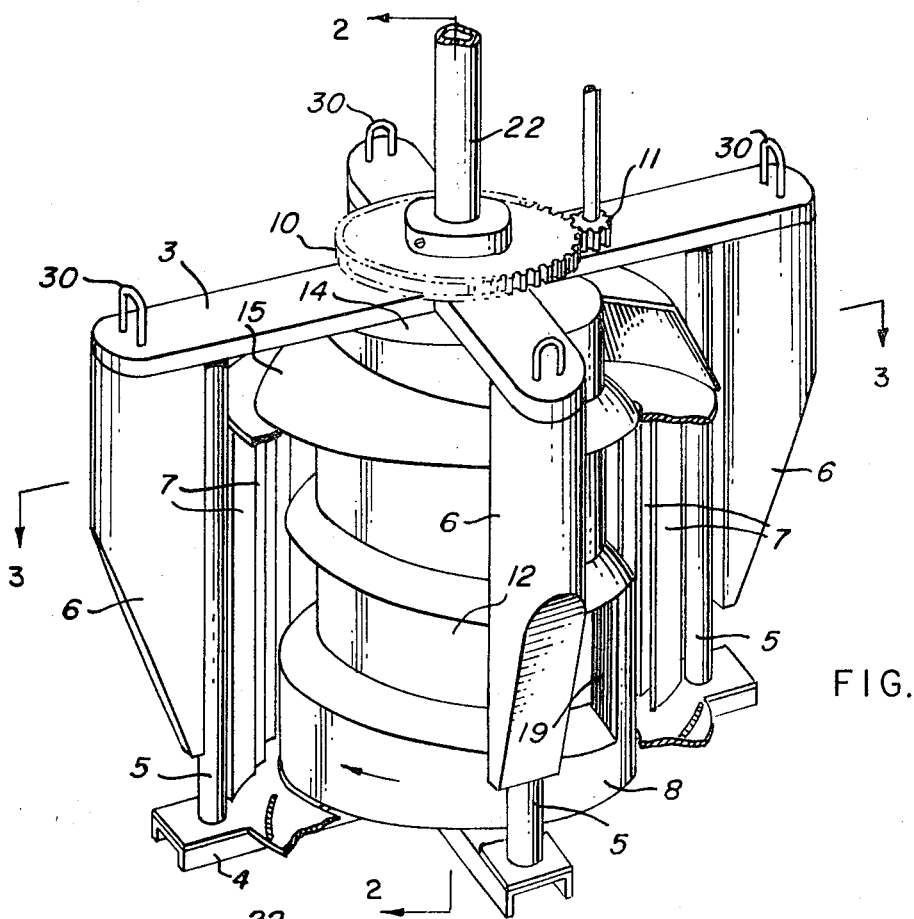
FIG. 1 is a perspective view of apparatus embodying the invention in a collector designed for positioning in a stream or other body of flowing water carrying floating pollutants adapted to separate the latter from the water by means of an inverted spiral V-shaped trough moving rotatively with respect to the water as heretofore mentioned.
Figure 2:
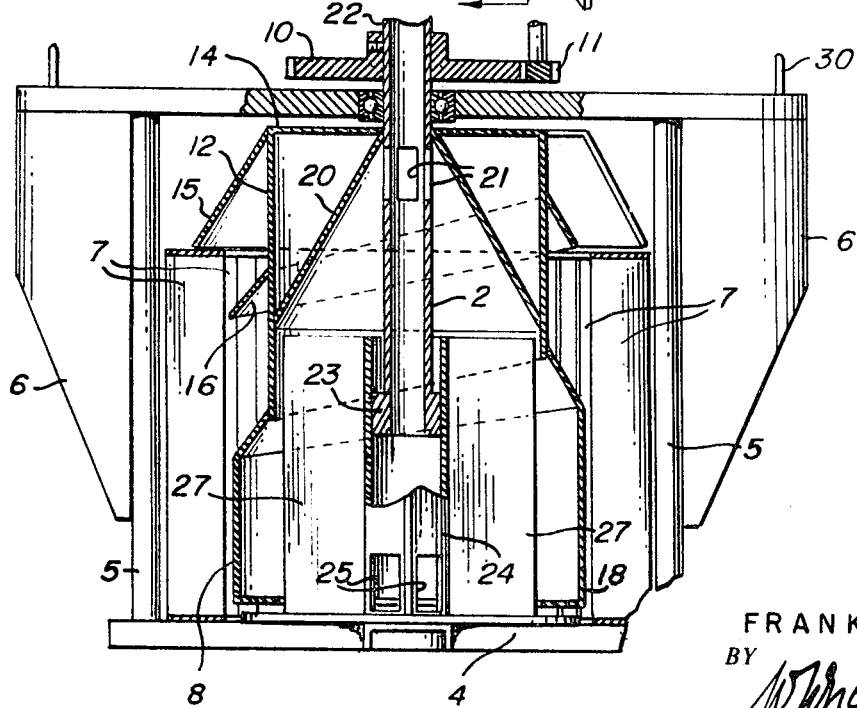
FIG. 2 is a section thereof on line 2—2 in FIG. 1.
Figure 3:
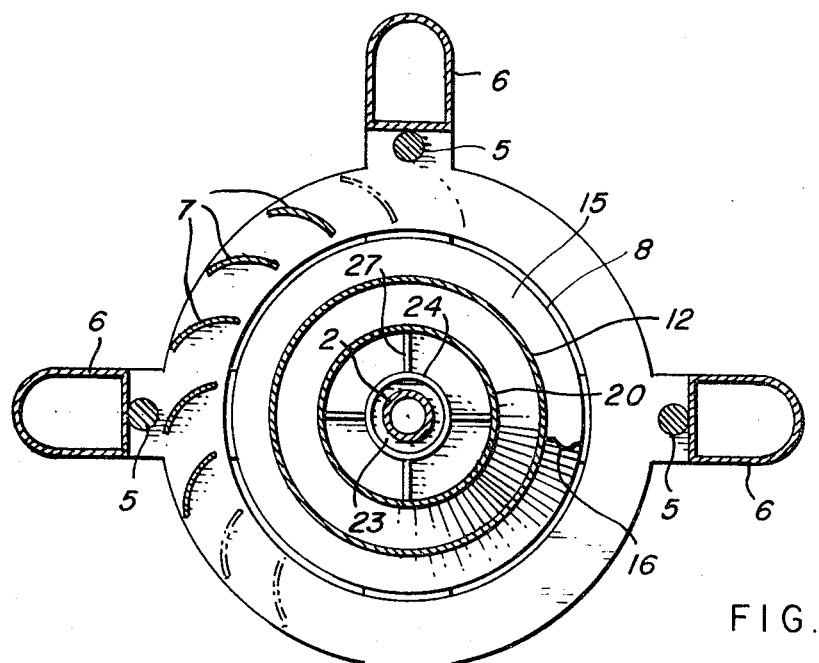
FIG. 3 is a section on line 3—3 in FIG. 1.
Figure 4:
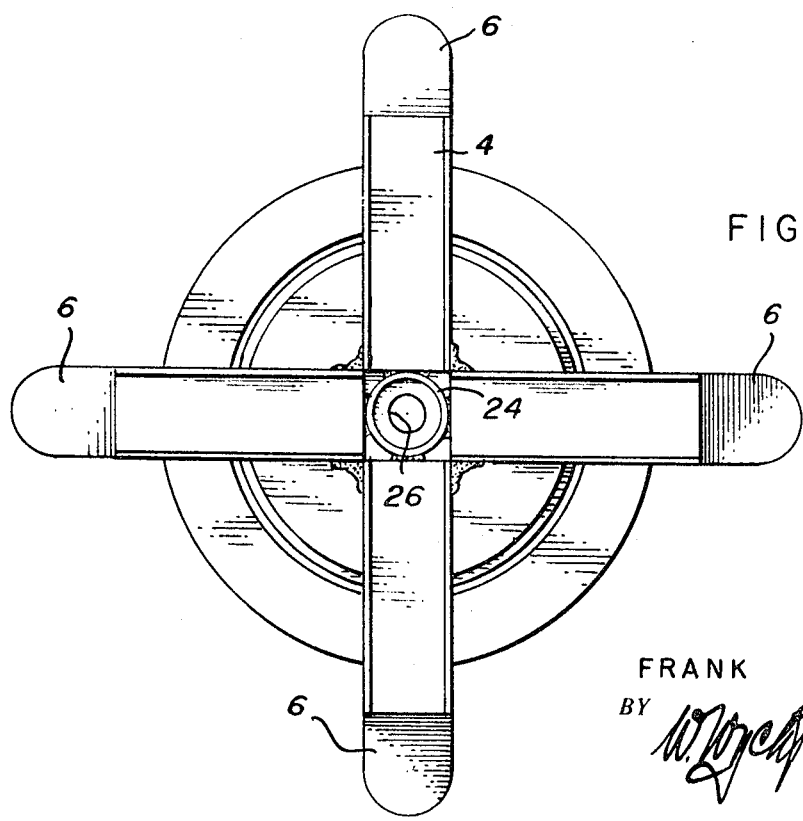
FIG. 4 is a bottom plan view of the apparatus.

Thus in the embodiment of the invention illustrated in FIG. 1 having a vertical composite central shaft 2 journaled in its upper cruciform frame member 3 and lower generally similar frame member 4 has said frame members rigidly interconnected by upstanding stanchions 5, to which are integrally secured buoyancy tanks 6 imparting buoyancy in water to the apparatus as a whole, while maintaining shaft 2 and associated components substantially vertical therein and inhibiting swirling.

Within the cage defined by frame members 3,4 and 5 are disposed circumferentially spaced stabilizing vanes 7, surrounding a rotor 8 rotatably mounted on shaft 2 and now to be more fully described.

The shaft 2 is designed to be rotated relatively to the frame by a prime mover (not shown) through a ring gear 10 and spur gear 11 carrying with it rotor 8 comprising a cylindrical drum 12 closed at its upper end by a head 14 and carrying about its cylindrical periphery a spirally disposed depending skirt 15 defining with the drum surface an inverted generally V-shaped trough or channel 16 which descends from the level of head 14 to the lower open end of the drum, and carrying in turn a depending cylindrical skirt 18 depending below the lower end of the drum. A port 19 in the side of the latter communicates with the trough 16 adjacent its lower end to receive liquid discharged from the trough into the interior of the drum while an inverted funnel 20 in the drum coalesces and accumulates such liquids adjacent the top of the drum for discharge through ports 21 into the tubular upper end portion 22 of shaft 2 for removal by a pump (not shown) or otherwise for disposition relatively free of water occulusions.

Within the drum, and providing a radial bearing 23 for the lower end of shaft 2 is disposed an axial upstanding tubular supporting stud 24 secured to lower frame member 4 and providing ports 25 communicating with an axial port 26 in frame member 4 for discharge of water accumulating in the drum. Radial fins 27 projecting outwardly from the stud 24 inhibit swirling of the liquids in drum 12 and assure the orderly flow of water therefrom through ports 25 and 26.

The lower end of the lower cylindrical skirt 18 carries an inwardly projecting annular flange 28 which, rotating with drum 12 just clears the fins 27 and forces the water received in the drum 12 to enter among fins 27 and pass from the apparatus through said ports.

In operation this apparatus is preferably moored at an appropriate point in a stream or other body of water carrying surface contamination, with the upper end of skirt 15 slightly above the level of the water surface. The rotor 8 is then set in motion, in the direction of the arrow in FIG. 1 causing the skirt 15 to draw into the trough 16 the surface water and floating liquids carried thereby. The buoyancy of the latter induces them to accumulate in the apex of the trough 16 and the pressure of following liquids then progressively carries the less buoyant liquids downward spirally along the trough until discharge port 19 is reached, whereupon the buoyant liquids enter the drum 12 and are forced toward the ports 21 adjacent the upper end of funnel 20, water accumulating in the drum being discharged therefrom through ports 25 and 26 as heretofore noted.

While this embodiment of the invention is designed primarily to be moored at a relatively fixed station in a moving stream of contaminated water there is of course no objection to its being towed through a relatively quiescent body of water carrying floating contaminants for removal of the latter therefrom, and clevises 30 are provided at the ends of the arms of frame member 3 for attachment of hoisting or towing connections (not shown).

In the embodiment of the invention illustrated in FIGS. 5–8 inclusive like principles of separation are employed, but relative motion of inverted V-shaped troughs intersecting the liquid surface is effected by their translation along relatively rectilinear paths rather than by rotation about an axis as previously described.

This embodiment thus assumes the form roughly of a sea sled comprising a generally rectilinear deck 35 having depending side plates 36,37, a stern transom 38 and a composite keel plate 39 defining with the deck, side plates and stern transom an air-tight buoyancy chamber 40 which keeps the craft afloat.

Keel plate 39 comprises a plurality of relatively narrow strips 41 extending fore and aft along the sled at a small angle to the horizontal plane of deck 35 and defining inverted V-shaped troughs or channels 42. Baffles 43 extending transversely of strips 41 angularly forward and downward restrict the eddying effects of the water while leaving the troughs 42 unobstructed for passage of less dense liquids rearwardly and downwardly along said troughs.

At the lower end of the latter a substantially pyramidal funnel 45 defines a collecting chamber 46 connecting with said troughs and carrying a baffle 47 which also assists in controlling eddying. A bottom plate 48 paralleling deck 35 defines with the forward edge of funnel 45 a horizontally elongated port 49 through which the troughs discharge into the funnel. At the stern edge of the bottom plate 48 a pivoted angle plate 50 is adjustably supported from rearward projections 51, 52 of the side plates to regulate the escape of water from the funnel through the stern discharge port 53 defined by stern transom 38, the side plates 36,37 and bottom plate 48 and insure coalescence and accumulation in the funnel of all buoyant liquids entering through port 49.

At the forward end of the keel plate a splash guard comprising an angularly upwardly projecting strip or plate 55 confines surface liquids to the area of entrapment by the V-shaped troughs 42 while jet pipes 56 connected with a source of water under pressure, carried by the attending self propelled craft (not shown) provide for periodically or continuously flushing out the area of the troughs to prevent their obstruction by semifluid or solid debris which may be encountered.

It will be evident that when one or more of these craft are translated over the surface of a body of water, intercepting floating liquids during their passage, such liquids are accumulated in funnel 45 and are available for discharge by a pump or the like, (not shown) through a pipe connection 57 at the apex of the funnel which may be connected as by flexible hose, either to an accompanying floating tank or directly to the towing vessel.

I claim:

1. The method of separating liquids which comprises translating relatively to the surface of a liquid having a liquid of less density floating thereon and along a path substantially parallel to said surface means comprising an elongated channel forming structure presenting a channel substantially inverted V-shaped in transverse section while maintaining the vertex of said channel at a small angle to the plane of the interface of said liquids, with one end of said channel projecting above said interface and extending angularly upwardly in the direction of translation of said means from the intersection of said channel vertex with said interface and collecting from the submerged opposite end of said channel below said interface liquid of less density than the surrounding liquid.

2. A method as defined in claim 1 in which said channel extends spirally with relation to the surrounding liquids and said translation is by movement of rotation about a vertical axis.

3. A method as defined in claim 1 in which said channel extends substantially rectilinearly parallel in one plane to the direction of translation of said channel forming structure.

4. A method as defined in claim 1 in which the submerged end of said channel communicates with a chamber of progressively decreasing transverse area upwardly from the end of said channel whereby the liquid of lesser density discharged from the lower end of said channel accumulates adjacent the upper end of said chamber.

5. Apparatus for separating liquids comprising means defining an elongated substantially V-shaped channel, means for translating the channel relatively to a body of liquid having a liquid of less density floating on its surface along a path substantially parallel to said surface, means for maintaining the channel vertex disposed in the direction of translation of the apparatus at an acute angle to the liquid interface between the liquids and extending in the opposite direction at an angle to said interface therebelow, and means disposed adjacent the submerged end of the channel for receiving therefrom the less dense liquid directed downwardly from said interface by said channel discharged from said submerged end of the channel.

6. Apparatus as defined in claim 5 in which said channel defining means define a channel extending spirally about an axis and said channel translating means translate said channel defining means rotatively about said axis.

7. Apparatus as defined in claim 6 in which said receiving means comprise a substantially cylindrical drum coaxial with said channel defining means and a substantially frusto-conical partition having an axial discharge conduit extending upwardly from the interior of the drum above the zone of discharge of liquid from the channel into the drum.

8. Apparatus as defined in claim 5 in which said channel extends rectilinearly in a direction substantially parallel in one plane to the direction of translation of said channel defining means and said receiving means define a chamber having boundaries converging upwardly to a discharge port.

9. Apparatus as defined in claim 8 comprising means defining a plurality of parallel rectilinear channels extending parallel to the direction of translation of said channel defining means and at an acute angle in said direction to the liquid interface and which discharge at their lower ends through a common port into said receiving means.

10. Apparatus as defined in claim 6 in which means extending parallel to said axis present a plurality of substantially plane surfaces extending radially outwardly from the path of said channel defining means, said first mentioned means remaining stationary relative to said channel defining means during rotative translation of said channel defining means.

* * * * *